Oct. 31, 1950  K. SPECK  2,528,185
BRACELET CHAIN
Filed May 16, 1947
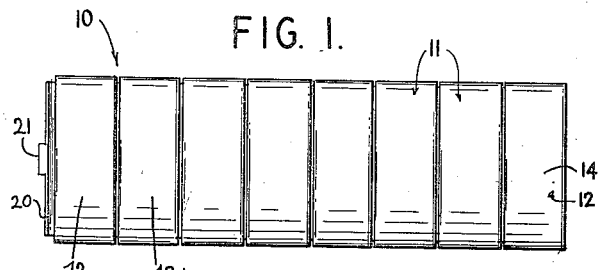
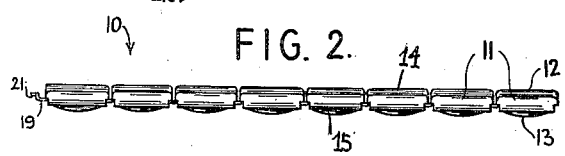
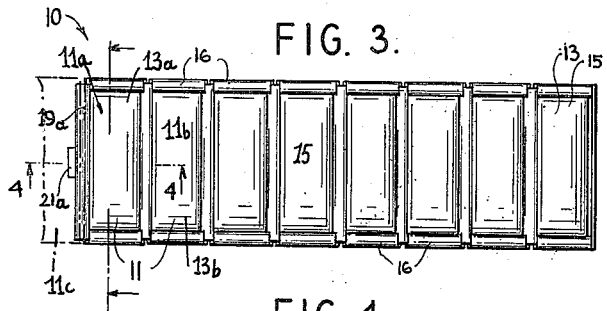
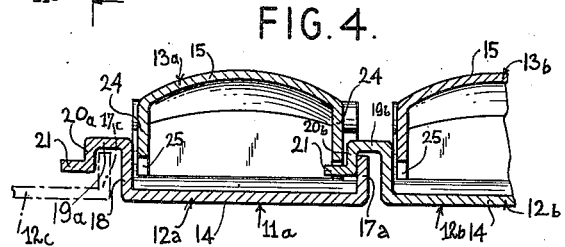
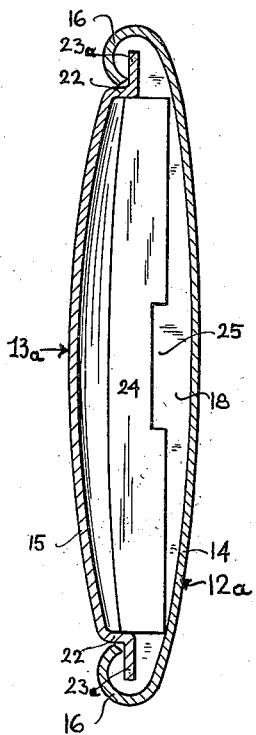
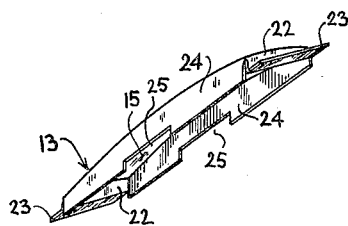
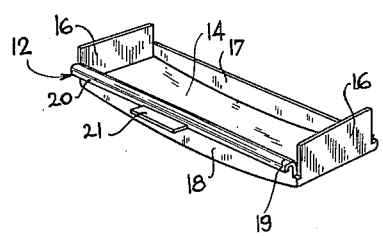
KURT SPECK,
INVENTOR.
BY: Julian J. Wittel,
HIS ATTORNEY.

Patented Oct. 31, 1950

2,528,185

UNITED STATES PATENT OFFICE 2,528,185

BRACELET CHAIN

Kurt Speck, Palisades Park, N. J., assignor to Nanasi Co., Inc., West New York, N. J., a corporation of New Jersey Application May 16, 1947, Serial No. 748,506

2 Claims. (Cl. 59—80)

This invention relates to jewelry chains, particularly chains for bracelets, and has for its main object to provide a chain of this character, which will be more simple in construction than bracelet chains heretofore proposed.

Another object of this invention is to provide a bracelet chain which may be built up of two very simple elements, in a quick, efficient manner, by mechanical machine operations, and which on account of these characteristics, may be manufactured at a very low cost.

Still a further object of my invention is to provide a bracelet chain of the type indicated, which nevertheless will be easily flexible, and which will have novel, attractive, aesthetic appearance and effect.

Still further objects of this invention will be apparent as the specification of the same proceeds.

In the drawings forming a part of this specification and accompanying the same:

Fig. 1 is a plan view of a portion of a chain constructed according to my invention, while Fig. 2 is a side or edge view thereof, and Fig. 3 is a plan view of the rear side of the same;

Fig. 4 is a sectional view, the section being taken on the line 4—4 of Fig. 3, and Fig. 5 is another transverse sectional view on the line 5—5 of Fig. 3; and on a greatly enlarged scale;

Fig. 6 is a perspective view of the outer or exposed element of each link in my chain, and Fig. 7 is a perspective view of the other, inner, element used to construct each link in my chain.

Referring now to the drawings, more in detail, by characters of reference, the numeral 10 indicates my novel bracelet chain, in general, being built of links 11, which are identical, closely set, and still flexible or pivoted, as will be more fully explained hereinafter.

Each link 11 will be built up of two elements and I do not use any other elements in the chain, wherefore the same may be built of a plurality of two members, a pair of each being used for each link.

In Fig. 6 I show one of these elements or members in the link, being the one which is on the outside of the chain, and generally I indicate the same by the numeral 12, while in Fig. 7 I indicate its companion element or member which will be on the inner side of the ready chain, and which I generally indicate by the numeral 13.

As will be seen by inspecting the drawings, in the embodiment shown, each link is more or less of shallow rectangular box shape, the inner element 13 being shorter and narrower than its companion, so that the two may be placed into pairs in a reverse position, the small element 13 being placed within the larger element 12, the bottom 14 of the larger element being on the outside of the chain, and the bottom 15 of the smaller element being on the inside, whereby the chain will show smooth and entirely closed design at both sides, as will also be more fully explained presently.

The outer link member 12 will have end walls or flanges 16, a plain side wall 17 considerably lower than the end walls, and a similar low opposite side wall 18, which, however, will have its upper end curved downwardly and outwardly, as indicated at 19, and depending outer flanges 20 from the center of which projects a square extension 21, generally in the longitudinal direction of the chain.

The companion or inwardly turned link member 13 will have short end walls 22 continued in outwardly turned flanges 23, and it will have identical right and left side walls 24 somewhat higher than the end walls, but a center portion 25 of each being removed, as indicated in Fig. 7.

When constructing my novel chain, the short side wall 17a of an outer element 12a (Fig. 4) will be hooked underneath the curved and depending portions 19b and 20b, respectively of the earlier adjacent outer link element 12b, whereupon an inner shorter element 13a will be placed into said outer element 12a in a reverse position, as will be seen in Figs. 4 and 5, and then the two end walls 16 of the outer link element 12a will be bent inwardly over the respective end flanges 23a of said smaller inner element 13a.

With this extremely simple operation, the respective link 11a of my chain has been made and pivotally linked into the earlier link formed on the earlier outer member 12b, as will be understood.

Now, a third link member 11c (not shown) may be built in a similar manner from a third outer member 12c, the short side 17c of which will be placed underneath the outwardly curved flange 19a of the link 11a, the construction of which has been just described.

In this manner any number of links may be constructed, the next one always pivotedly hooked into the earlier one.

It also will be seen that the longitudinal extensions 21 in the larger element 12 will project into the removed recessed portion 25 of the respective side wall of the smaller element 13, and upon said smaller element being locked in said larger element by the turning down of the end wall 16, it will hold the next large link member 12 through said extension 21, and in this manner the adjacent links in the chain will be locked to one another, while permitting their relative pivoting motion, as has been mentioned hereinbefore.

What I claim as new and want to protect by Letters Patent of the United States, is:

1. A chain composed of two-piece links, one piece of each link including a closed top face having bent down ends, a horizontally projecting flange on each of said ends, bent down sides, at least one side having a notch at the edge, a second outer piece of each link including a closed bottom, ends, bent over tips on the ends adapted to each overlie the adjacent flange of the first piece, a straight edged side, one side having an outwardly and downwardly curled extension adapted to overlie and catch the adjacent side of the adjacent outer piece, and a further horizontal extension of the curled extension adapted to lie within the notch of the adjacent top when it is held by the bent over tips embracing said first piece flanges.

2. A chain composed of two-piece links, one piece of each link including a top body face having bent-down ends, a projecting flange on each of said ends, bent down sides each having an elongated notch centrally of its edge, a bottom piece of each link including a bottom face, ends, bent over tips on the ends adapted each to overlie the adjacent flange of the top body face, straight edged sides, one side having an outwardly and downwardly curved extension adapted to overlie and catch the adjacent side of the adjacent bottom piece, and a further extension of the curled extension adapted to fit in the adjacent elongated notch when the bottom piece is held to the top piece by tips overlying the adjacent flanges.

KURT SPECK.

REFERENCES CITED

The following references are of record in the file of this patent:

UNITED STATES PATENTS

| Number | Name | Date |
| --- | --- | --- |
| 1,224,585 | Wave | May 1, 1917 |
| 1,304,706 | Pruefer | May 27, 1919 |
| 2,143,703 | Kestenman | Jan. 10, 1939 |
| 2,170,073 | Hess | Aug. 22, 1939 |